United States Patent Office.

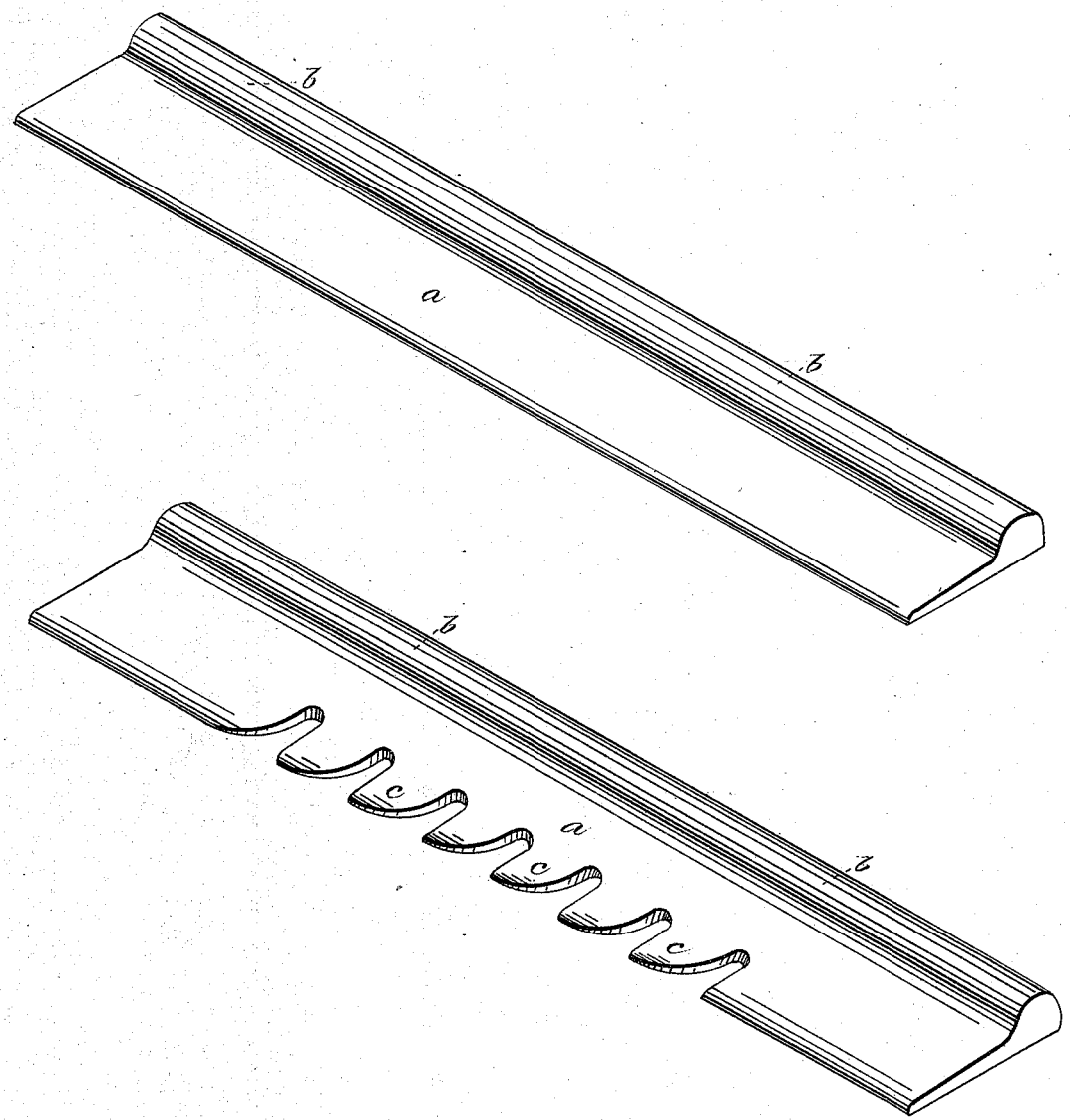

WILLIAM J. LEWIS, OF PITTSBURG, PENNSYLVANIA.

Letters Patent No. 107,930, dated October 4, 1870.

IMPROVEMENT IN RACKS FOR WAGON-BRAKES.

The Schedule referred to in these Letters Patent and making part of the same.

*To all whom it may concern:*

Be it known that I, WILLIAM J. LEWIS, of Pittsburg, in the county of Allegheny and State of Pennsylvania, have invented a new and useful Improvement in Racks for Wagon-Brakes; and I do hereby declare the following to be a full, clear, and exact description thereof, reference being had to the accompanying drawing making a part of this specification, in which—

Figure 1 is a perspective view of the rolled blank or bar from which my improved rack is made, and Figure 2 is a similar view of the finished rack.

Ratchet-racks for wagon-brakes have heretofore commonly been made by forging from flat bar-iron of uniform thickness.

By my improvement, I produce a rack of an improved shape, from a bar of flat iron, having a bead or rib running along the full length of its back edge, and thinned down from the base of the rib to its outer edge.

To enable others skilled in the art to make my improvement, I will describe its construction.

The bar $a$ is rolled in grooved cylindrical rolls, to the form shown, with a rib, $b$, running along its back edge, upon its upper face.

In the leap or thinned outer edge is cut a series of ratchet-teeth, $c$, for engaging the lever of the brake.

This form of rack is much stronger and lighter than those heretofore in use, and, as I roll them, I make a great saving in time and labor.

What I claim as my invention, and desire to secure by Letters Patent, is—

A rolled rack for wagon-brake, made substantially as described.

In testimony whereof, I, the said WILLIAM J. LEWIS have hereunto set my hand.

WM. J. LEWIS.

Witnesses:
JOHN GLENN,
THOS. B. KERR.